United States Patent [19]
Segatta

[11] Patent Number: 5,536,774
[45] Date of Patent: Jul. 16, 1996

[54] USE OF MALEATED STYRENE-ETHYLENE-BUTYLENE-STYRENE TRIBLOCK POLYMER FOR IMPROVED ADHESION

[75] Inventor: Thomas J. Segatta, Lawton, Okla.

[73] Assignee: The Goodyear Tire & Rubber Company, Akron, Ohio

[21] Appl. No.: 348,641

[22] Filed: Dec. 2, 1994

[51] Int. Cl.$^6$ ............................................. C08L 53/02
[52] U.S. Cl. ................................................... 524/505
[58] Field of Search ........................ 525/89, 92 L, 525/93; 524/505

[56] References Cited

U.S. PATENT DOCUMENTS

| | | | |
|---|---|---|---|
| 4,880,878 | 11/1989 | Hines et al. | 525/89 |
| 5,191,024 | 3/1993 | Shibata et al. | 525/314 |
| 5,216,074 | 6/1993 | Imai et al. | 525/66 |
| 5,405,897 | 4/1995 | Segatta et al. | 524/290 |

*Primary Examiner*—Vasu S. Jagannathan
*Attorney, Agent, or Firm*—Bruce J. Hendricks

[57] ABSTRACT

There is disclosed a method for adhering rubber to reinforcing materials which comprises embedding a textile fiber or metal reinforcing material in a vulcanizable rubber composition comprising rubber, a vulcanizing agent, reinforcement, a methylene donor, a methylene acceptor and a maleic anhydride functionalized triblock copolymer having polystyrene endblocks and poly-(ethylene/butylene) midblocks.

3 Claims, No Drawings

USE OF MALEATED STYRENE-ETHYLENE-BUTYLENE-STYRENE TRIBLOCK POLYMER FOR IMPROVED ADHESION

BACKGROUND

It has been conventional practice to prepare various textile reinforcing fibers to be used in contact with rubber formulations by pretreating them with a mixture of a rubber latex and a phenolformaldehyde resin in which the phenol has almost always been resorcinol. This is the so-called "RFL" (resorcinol-formaldehyde-latex) method. Another method commonly used is to generate the resin in situ (in the vulcanized rubber/textile matrix) by incorporating in the rubber a formaldehyde (or methylene) donor compound, for example, hexamethylenetetramine or hexamethoxymethylmelamine and a formaldehyde (or methylene) acceptor compound, for example, a dihydroxybenzene compound such as resorcinol. The in situ method hats been found to be particularly effective where the reinforcing material is brass-coated steel wire since pretreatment of the wire with the RFL system has been observed to be largely ineffective.

The in situ formed resins have been observed to enhance adhesion between the rubber and the reinforcing material. This enhancement of adhesion is by a mechanism that is not completely understood. The in situ method which entails compounding a vulcanizable rubber stock with the phenol-formaldehyde components is known in the art. The most commonly employed methylene acceptor is resorcinol, while the more commonly employed methylene donors are the N-substituted oxymethylmelamines. The resin is formed in situ during vulcanization of the rubber creating a bond between the fiber and the rubber irrespective of whether the fiber has been pretreated or not.

The rubber industry utilizes resorcinol in conjunction with methylene donors to form resins which are used in rubber compounds to enhance filamentary reinforcement and to improve the physical properties, including aged physical properties, or tires and other compounded rubber formulations. These resins, whether preformed or formed in situ, can increase the dynamic rubber stiffness, tire treadwear, interfacial adhesion and fabric adhesion to the rubber compound; while desirably maintaining the values of and hopefully reducing the rolling resistance and heat buildup of a tire.

With the constant demand on quality, producers of reinforced vulcanizates are under pressure to produce more products able to withstand greater fatigue and longer-term service. Therefore, any achievements in improving the interfacial adhesion between the reinforcement and rubber environment is needed.

SUMMARY OF THE INVENTION

The present relates to enhancing the adhesion of rubber to reinforcing materials through the use of maleic anhydride functionalized triblock copolymer having polystyrene endblocks and poly-(ethylene/butylene) midblocks.

DETAILED DESCRIPTION OF THE INVENTION

There is disclosed a method for adhering rubber to reinforcing materials which comprises embedding a textile fiber or metal reinforcing material in a vulcanizable rubber composition comprising rubber, a vulcanizing agent, reinforcement, a methylene donor, a methylene acceptor and maleic anhydride functionalized triblock copolymer having polystyrene endblocks and poly-(ethylene/butylene) midblocks.

In addition, there is disclosed a vulcanizable rubber composition comprising rubber, a vulcanizing agent, reinforcement, a methylene donor, a methylene acceptor and maleic anhydride functionalized triblock copolymer having polystyrene end)locks and poly-(ethylene/butylene) midblocks.

One key aspect of the present invention is the use of a maleic anhydride functionalized triblock copolymer having polystyrene endblocks and poly-(ethylene/butylene) midblocks. A functionality of from 1 to 5 percent by weight as bound maleic anhydride may be used. Preferably, a functionality of 1 to 2 percent by weight is used. One example of such copolymer is commercially available from Shell Chemical Company under the designation Kraton® FG1901X. This material has a specific gravity of 0.91g/cc, a polymeric styrene content of 28 percent by weight, a functionality of 2 percent by weight as bound maleic anhydride, a Shore A Hardness of 75, a tensile strength (ASTMD412) of 5000 and an elongation at break of 500 (ASTMD412). The maleic anhydride functionalized triblock copolymer may be present in an amount ranging from about 1 to 50 parts by weight per 100 parts by weight of rubber (hereinafter referred to herein as phr). For purposes of this disclosure, the triblock copolymer is not to be considered as a rubber when calculating phr in the overall vulcanizable rubber composition. Preferably, the amount of triblock copolymer ranges from 5 to 20 phr.

Suitable rubbers which may be used in the present invention include natural rubber, polybutadiene, cis-1,4-polyisoprene, polychloroprene, acrylonitrile-butadiene copolymers, butadiene-styrene copolymers, ethylene-propylene copolymers, ethylene-propylenediene terpolymers, polyepichlorohydrin terpolymers, acrylic and fluoroelastomers, unsaturated and saturated block polymers and blends thereof. The preferred rubbers are natural rubber, polybutadiene, cis-1,4-polyisoprene, acrylonitrile-butadiene copolymers and butadiene-styrene copolymers.

Another feature to the present invention is the use of a vulcanizing agent. Examples of suitable vulcanizing agents include elemental sulfur (free sulfur) or Sulfur donating vulcanizing agents. Representative sulfur donating vulcanizing agents are amine disulfides, polymeric polysulfides and sulfur olefin adducts. Preferably, the vulcanizing agent is elemental sulfur. Vulcanizing agents are used in an amount ranging from about 0.5 to 8 phr, with a range of from 1.0 to 3.0 phr being preferred.

The rubber compositions containing the maleic anhydride functionalized triblock copolymer contain a methylene donor. The term "methylene donor" is intended to mean a compound capable of reacting with the methylene acceptor and generate a resin in situ. Examples of methylene donors which are suitable for use in the present invention include hexamethylene tetramine, hexaethoxymethylmelamine, hexamethoxymethylmelamine, lauryloxymethylpyridinium chloride, ethyoxymethylpyridinium chloride, trioxan hexamethoxymethylmelamine, the hydroxyl groups of which may be esterified or partly esterified, and polymers of formaldehyde such as paraformaldehyde. In addition, the methylene donors may be N-substituted oxymethylmelamines, of the general formula:

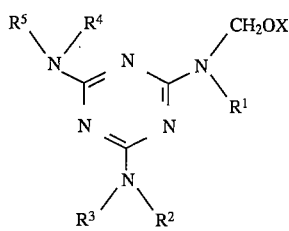

wherein X is an alkyl having from 1 to 8 carbon atoms, $R^1$, $R^2$, $R^3$, $R^4$ and $R^5$ are individually selected from the group consisting of hydrogen, an alkyl having from 1 to 8 carbon atoms, the group -$CH_2OX$ or their condensation products. Specific methylene donors include hexakis-(methoxymethyl) melamine, N, N',N"-trimethyl-N,N',N"-trimethylolmelamine, hexamethylolmelamine, N,N',N"-dimethylolmelamine, N-methylolmelamine, N,N'-dimethylolmelmine, N,N',N"-tributyl-N,N',N"-trimethylolmelamine. The N-methylol derivatives of melamine are prepared by known methods. The amount of methylene donor that is used may vary. For example, amounts ranging from 0.5 to 10 phr may be used. Preferably, from 1 phr to 3 phr is used.

In addition to the methylene donor, a methylene acceptor is used. A representative example of methylene acceptor is resorcinol. The amount of methylene acceptor that is used may vary. For example, amounts ranging from 0.5 to 10 phr may be used. Preferably, from 1 phr to 3 phr is used.

The weight ratio of methylene donor to methylene acceptor may vary. Generally speaking, the weight ratio will range from 1:10 to 10:1. Preferably, the weight ratio ranges from 1:3 to 3:1.

The present invention may be used with conventional textile fiber or metal reinforcing materials. Representative materials include polyamides, Kevlar®, polyester, carbon fiber and metallic cords and monofilaments. Such materials may be in the form of chopped fibers or continuous construction.

In addition to the above, other rubber additives may also be incorporated in the rubber. The additives commonly used in rubber vulcanizates are, for example, carbon black, tackifier resins, processing aids, antidegradants, fatty acids, activators, waxes oils and peptizing agents. By class, representative of the conventional antioxidants and antiozonants (commonly classified together as antidegradants) which may be used include monophenols, bisphenols, thiobisphenols, thioalkylphenols, polyphenols, hydroquinone derivatives, phosphates, thioesters, naphthylamines, diphenylamines and other diarylamine derivatives, para-phenylenediamines and quinolines. Typical additions of carbon black comprise about 20 to 100 parts by weight of diene rubber (phr), which for many tire applications is generally from about 40 to 70 phr. Typical additions of tackifier resins comprise about 2 to 10 phr. Typical amounts of processing aids comprise about 1 to 8 phr. Typical amounts of antioxidants comprise 1 to about 5 phr. Typical amounts of antiozonants comprise is to about 5 phr. Typical amounts of fatty acids such as stearic acid, oleic acid and the like comprise from about 1 to about 2 phr. Typical amounts of zinc oxide comprise 3 to 5 phr. Typical amounts of waxes comprise 1 to 5 phr. Typical amounts of processing oils comprise 5 to 50 phr. Typical amounts of peptizers comprise 0.1 to 1 phr.

Accelerators are generally used in rubber compositions to control the time and/or temperature required for vulcanization and to improve the properties of the vulcanizate. In some cases, a single accelerator system is used; i.e., primary accelerator. Conventionally, a primary accelerator i used in amounts ranging from about 0.5 to 2.0 phr. In many other cases, combinations of two or more accelerators are used which may consist of a primary accelerator which is generally used in the larger amount (0.5 to 2.0 phr), and a secondary accelerator which is generally used in smaller amounts (0.05–0.50 phr) in order to activate and to improve the properties of the vulcanizate. Combinations of these accelerators have been known to produce a synergistic effect of the final properties and are somewhat better than those produced by use of either accelerator alone. In addition, delayed action accelerators may be used which are not affected by normal processing temperatures but produce satisfactory cures at ordinary vulcanization temperatures. Suitable types of accelerators that may be used include amines, disulfides, guanidines, thioureas thiazoles, thiurams, sulfenamides, dithiocarbamates and xanthates. Preferably, the primary accelerator is a sulfenamide. If a secondary accelerator is used, the secondary accelerator is preferably a guanidine, dithiocarbamate or thiuram compound.

Vulcanization of the rubber compound of the present invention is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air or in a salt bath.

The rubber composition containing reinforcing materials find utility in, for example, tires, motor mounts, rubber bushings, power belts, printing rolls, rubber shoe heels and soles, rubber floor tiles, caster wheels, elastomer seals and gaskets, conveyor belt, wringers, hard rubber battery cases, automobile floor mats, mud flaps for trucks, ball mill liners and the like. Preferably, the rubber compositions containing the reinforcing materials are used in tire applications including for use in belts, sidewalls, carcasses, apex and chafers.

The following examples are provided for illustrative purposes and should not be considered as limiting the scope of the invention. The parts and percentages are by weight unless otherwise indicated.

EXAMPLE 1

Adhesion was evaluated using the Tire Cord Adhesion Test (TCAT). Samples were prepared and tested according to the procedures described by D W Nicholson, D. I. Livingston and G. S. Fielding-Russell, *Tire Science and Technology* (1978) 6, 114; G. S. Fielding-Russell and D. I. Livingston, *Rubber Chemistry and Technology* (1980) 53, 950; and R. L. Rongone, D. W. Nicholson and R. E. Payne, U.S. Pat. No. 4,095,465 (Jun. 20, 1978).

Table I shows the ingredients used in this example. In addition, conventional amounts of carbon black, zinc oxide, processing oil, sulfenamide accelerator and guanidine accelerator were used. The rubber compound was prepared in a two-stage procedure using a Banbury® mixer. The adhesion tests were conducted with polyester cord. All parts and percentages are by weight unless otherwise noted.

TABLE I

| Rubber Compound Used in Adhesion Tests | |
|---|---|
| Material | Parts by weight |
| Polybutadiene[1] | 17.50 |

TABLE I-continued

Rubber Compound Used in Adhesion Tests

| Material | Parts by weight |
|---|---|
| Emulsion SBR[2] (30 phr of SBR and 11.25 phr of oil) | 41.25 |
| Natural Rubber | 52.50 |
| Resorcinol | 1.00 |
| Hexamethoxymethyl Melamine (Active) | 1.00 |
| Sulfur | 2.25 |
| Maleic Anhydride Functionalized Triblock Copolymer[3] | Varied |

[1]Budene ® 1207 commercially available for The Goodyear Tire & Rubber Company
[2]PFL 1712C commercially available for The Goodyear Tire & Rubber Company
[3]Kraton ® FG 1901X The stress strain data for the samples were obtained using indicated cure parameters as set out in Table II below along with the adhesion data.

TABLE II

|  | Sample 1 Control | Sample 2 | Sample 3 |
|---|---|---|---|
| Kraton ® FG 1901X | 0 | 7.5 | 15.0 |
| Pull Force[1] (Neutons) | 139 | 159 | 183 |
| 100% Modulus[2] (MPa) | 1.550 | 1.630 | 1.710 |
| 300% Modulus (MPa) | 7.670 | 7.490 | 7.190 |
| Tensile (MPa) | 13.78 | 11.95 | 12.05 |
| Elongation at Break (%) | 486 | 459 | 492 |

[1]36 minutes at 150° C.
[2]55 minutes at 175° C.

It can be seen that Samples 2 and 3 have modulus values similar to the control; however, they have a drastically higher pull-out force (cord adhesion).

What is claimed is:

1. A vulcanizable rubber composition comprising
   (a) 100 parts by weight of a rubber selected from the group consisting of natural rubber, polybutadiene, cis-1,4-polyisoprene, acrylonitrile-butadiene copolymers and mixtures thereof;
   (b) 0.5 to 8 phr of a vulcanizing agent selected from the group consisting of elemental sulfur and sulfur donating vulcanizing agents;
   (c) 0.5 to 10 phr of a methylene donor;
   (d) 0.5 to 10 phr of a methylene acceptor;
   (e) 1 to 50 phr of a maleic anhydride functionalized triblock copolymer consisting of a triblock copolymer having polystyrene endblocks and poly(ethylene/butylene) midblocks, a polymeric styrene content of 28 percent by weight and a functionality of 2 percent by weight as bound maleic anhydride; and
   (f) reinforcing cords made of a material selected from the group consisting of polyamides, polyester and metal.

2. The composition of claim 1 wherein the methylene donor is selected from the group consisting of hexamethylenetetramine, hexamethoxymethylmelamine, lauryloxymethyl-pyridinium chloride, ethyloxymethylpyridinium chloride, trioxan hexamethylolmelamine and paraformaldehyde.

3. The composition of claim 1 wherein the methylene acceptor is resorcinol.

* * * * *